(No Model.)

C. L. HOLLAND.
LAMP CHIMNEY AND HOLDER THEREFOR.

No. 579,270. Patented Mar. 23, 1897.

Witnesses.
Albert Popkins.
Carrie L. Acker.

Inventor
Charles L. Holland
by Arthur W. Harrison
Attorney

THE NORRIS PETERS CO., PHOTO-LITHO., WASHINGTON, D. C.

UNITED STATES PATENT OFFICE.

CHARLES L. HOLLAND, OF REVERE, MASSACHUSETTS.

LAMP-CHIMNEY AND HOLDER THEREFOR.

SPECIFICATION forming part of Letters Patent No. 579,270, dated March 23, 1897.

Application filed November 15, 1894. Serial No. 528,880. (No model.)

*To all whom it may concern:*

Be it known that I, CHARLES L. HOLLAND, a citizen of the United States, residing at Revere, in the county of Suffolk and State of Massachusetts, have invented certain new and useful Improvements in Lamp-Chimneys and Holders Therefor, of which the following, taken in connection with the accompanying drawings, is a specification.

In lamp-chimneys having a straight neck at their lower end and held on the burner by means of prongs pressing against said neck the said chimneys are liable to be jolted off by any sudden jar; and the object of my invention is to overcome this defect. To this end I form the straight neck of the chimney with a series of segmental circumferential projections in the same plane and the prongs of the burner with free ends which project inward and downward and fit over said projections and are adapted to pass between them when the chimney is turned and lifted, as hereinafter fully described, and pointed out in the claim.

Figure 1:
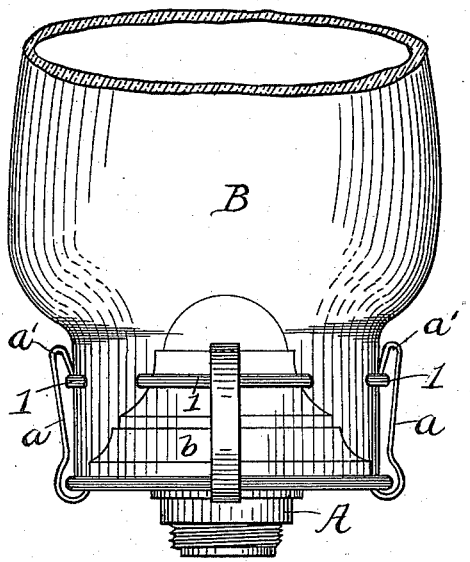
Figure 2:
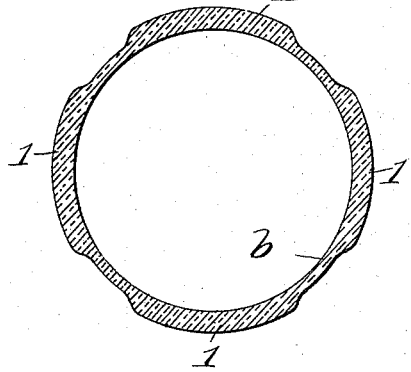
Figure 3:
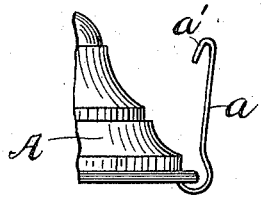
Figure 4:
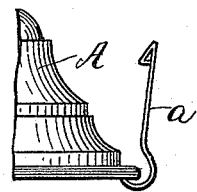

Referring to the accompanying drawings, Figure 1 represents a side view of a lamp burner and chimney embodying my invention. Fig. 2 is a horizontal section through the neck of a chimney on the line of the series of projections. Fig. 3 is a detail view showing a portion of a burner with a prong constructed according to my invention. Fig. 4 is a similar view showing a slight modification in the upper end of the prong.

A represents the burner, and B the chimney, the neck $b$ of which is formed with a series of segmental projections 1 in the same circumferential plane as shown in Figs. 1 and 2.

The prongs $a$ of the burner A are bent over at their upper ends, as shown at $a'$, Figs. 1 and 3, or they might be formed as shown in Fig. 4, the object being to provide free ends which project inward and downward to rest on the upper side of the projections 1 of the chimney.

It will be seen that by thus constructing lamp-chimneys and the prongs of the burner the prongs of the burner will spring over the projecting portions of the neck of the chimney if the latter is pressed downward to position while so turned that the said projections are in the vertical plane of the prongs; but the chimney can only be conveniently removed by first turning it to bring the spaces between the ends of the circumferential projections to the position opposite the free ends of the prongs, the prongs being sufficiently unyielding to prevent the accidental or easy removal of the chimney except by first turning it as described.

Having now described my invention, what I claim is—

The combination with a lamp-burner provided with prongs the free end of each of which projects inward and downward, and a chimney the base of which is cylindrical and provided with a series of segmental projections in the same circumferential plane, the ends of the adjacent projections being at a slight distance apart from each other, and the ends of the prongs engaging the upper sides of the segmental projections of the chimney and being sufficiently unyielding so that their ends may only be disengaged from the projections by turning the chimney to bring the spaces between the ends of the projections to a position opposite the free ends of the prongs, substantially as set forth.

In testimony whereof I have signed my name to this specification, in the presence of two subscribing witnesses, on this 9th day of November, A. D. 1894.

CHARLES L. HOLLAND.

Witnesses:
   CHAS. STEERE,
   EDWIN PLANTA.